United States Patent [19]

Pusatcioglu et al.

[11] Patent Number: 4,762,216
[45] Date of Patent: Aug. 9, 1988

[54] VEHICLE COMPONENT HAVING IMPROVED FRICTION MATERIAL

[75] Inventors: Selami Y. Pusatcioglu, Milwaukee, Wis.; Thomas A. Genise, Dearborn Heights, Mich.

[73] Assignee: Eaton Corporation, Cleveland, Ohio

[21] Appl. No.: 57,072

[22] Filed: Jun. 3, 1987

[51] Int. Cl.$^4$ .................. F16D 69/02; F16D 23/06
[52] U.S. Cl. ..................... 192/107 M; 106/36; 188/251 A; 192/53 F
[58] Field of Search ............ 192/53 F, 107 M; 106/36; 188/251 A

[56] References Cited

U.S. PATENT DOCUMENTS 3,983,979  10/1976  Richards ........................ 192/53 F
4,593,802  6/1986   Danko, Jr. ..................... 192/107 M

OTHER PUBLICATIONS

SPE Journal, P. E. Thomas et al., "Properties of Teflon Resins", pp. 89-94, Jun. 1956.

*Primary Examiner*—Allan D. Herrmann
*Attorney, Agent, or Firm*—A. E. Chrow

[57] ABSTRACT

A vehicle component such as a transmission blocker ring (81) having an improved friction material (56) is provided. Friction material (56) comprises a composite of from about 25% to about 75% by weight of a flurocarbon polymer and from about 75% to about 25% by weight of substantially uniformly dispersed ceramic fiber and which is provided with controlled crystallinity by reason of having been cooled at a rate of less than about 20° C. per minute after having been sintered at a predetermined sintering or annealing temperature and time for the friction material.

8 Claims, 1 Drawing Sheet

VEHICLE COMPONENT HAVING IMPROVED FRICTION MATERIAL

INTRODUCTION

This invention relates generally to a vehicle part such as a twin shaft transmission including a component such as a blocker ring enabling synchronous gear changes having an improved friction material thereupon for enhancing frictional engagement therewith and more particularly where the friction material is a composite of ceramic fibers and flurocarbon polymer whose frictional engagement characteristics have been improved as a result of the flurocarbon polymer having controlled crystallinity arising from the material having been cooled at a rate of less than about 20° C. per minute and more preferably less than about 5° C. per minute after having been sintered for a predetermined period of time at a temperature within a predetermined sintering temperature range for the polymer or having been heated at a temperature within a predetermined annealing temperature range for the polymer for a predetermined period of time that is less than the sintering temperature range.

BACKGROUND OF THE INVENTION

Composites of ceramic fiber and flurocarbon polymer, particularly polytetrafluoroethylene (PTFE) polymer, are known and are highly advantageous for use as friction material due to high temperature and corrosion resistance, particularly to greases, oils and fuel, in conjunction with having the ability to maintain a substantially constant surface friction factor under widely varying conditions.

An example of a friction facing material having proportedly superior dynamic frictional torque transmitting characteristics that comprises a composite of flurocarbon polymer and carbon particulates, and which may optionally include ceramic fibers is disclosed in U.S. Pat. No. 4,593,802, the disclosure of which is incorporated herein by reference.

Another example of a material believed to be a composite of ceramic fibers and polytetrafluoroethylene (PTFE) polymer is sold under the Trademark "Gylon" by the Garlock Company.

As used herein, the term "ceramic fibers" include fibers of silicon nitride, silicon carbide, and alumina-silicate fibers well known to those skilled in the art of ceramic fibers as well as including mixtures thereof.

As used herein the term "flurocarbon polymer" means those flurocarbon polymers whose crystallinity can be increased by controlling cooling rates from sintering or annealing temperatures and includes polytetrafluoroethylene (PTFE) polymer, fluorinated ethylene-propylene copolymer (FEP), and perfluoroalkoxy copolymer (PFA) of which PTFE, FEP and PFA are sold under the Trademark "Teflon" by the Dupont Company and (PTFE) under the Trademark "Halon" by Allied Corporation.

Also known is the effect that cooling rate has upon crystallinity of PTFE polymer after having been sintered at a temperature of from 340° C. to 440° C. for a prescribed period of time and after having been annealed at a temperature of from 323° C. to 323° C. for a prescribed period of time as reported by P. E. Thomas et al of the Dupont Company in an article titled "Properties of Teflon Resins" beginning page 89 in the June, 1956 SPE Journal. Generally, the article describes a substantial increase in crystallinity ranging from about 44% when the PTFE is water or air quenched after sintering to as high as 80% where it is cooled at a rate of 2° C./minute after sintering.

The article further discloses that although flexural modulus can be increased as much as five fold and compressive stress as much as 50% by increasing its crystallinity, compressibility can be reduced by as much as 50% and percent recovery after compression as much as 10%.

Thus, in view of the above, it would appear that increasing the crystallinity of PTFE would have a detrimental effect upon the ability of PTFE in conjunction with ceramic fibers to provide an effective frictional material involving repeated engagements where some degree of compression is involved due to its loss of resiliency and inability to recover completely or substantially completely from the compression.

It has been surprisingly discovered that, contrary to the teaching relative loss in resiliency and inability to recover completely or substantially completely from compression, increasing the crystallinity of a flurocarbon polymer such as PTFE by controlling the rate of cooling after a sintering or annealing operation actually enhances its effectiveness in conjunction with ceramic fibers as a frictional material particularly in vehicular applications.

SUMMARY OF THE INVENTION

Accordingly, it is an object of this invention to provide a vehicle component having an improved friction material comprising a composite of ceramic fiber and flurocarbon polymer.

It is still another object of this invention to provide a vehicle component having a ceramic fiber and flurocarbon composite friction material thereupon for enabling frictional engagement therewith whose frictional engagement characteristics have been improved by controlling crystallinity of the flurocarbon polymer.

DETAILED DESCRIPTION OF SOME PREFERRED EMBODIMENTS

Figure 1:
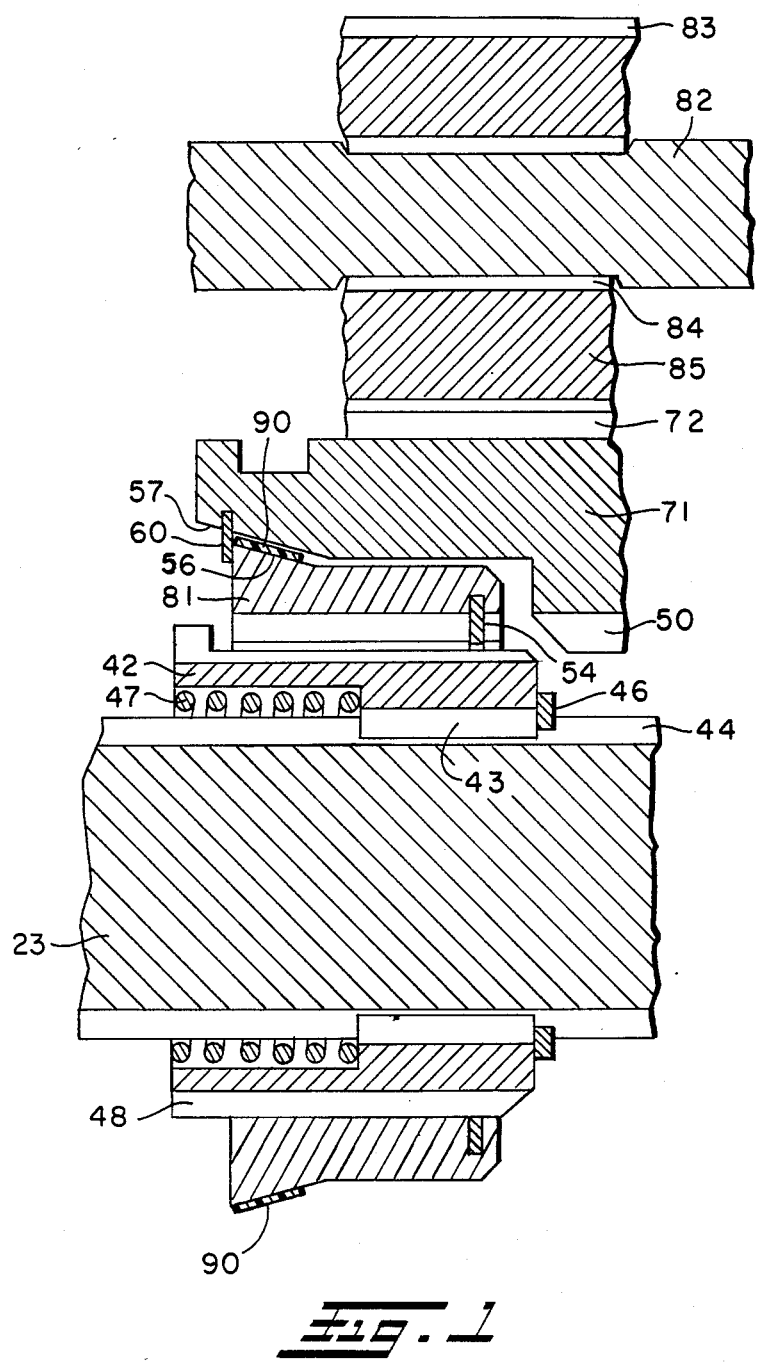
FIG. 1 is a partial central cross-section of a vehicular twin shaft transmission having a component in the form of a blocking ring 81 having an improved friction material 90 thereupon.

An example of a vehicular component upon which the improved friction material comprising a composite of ceramic fibers and flurocarbon polymer can be used to advantage is blocking ring 90 of a twin shaft transmission shown in FIG. 1 and which is described in greater detail in U.S. Pat. No. 3,983,979, assigned to the assignee of the present invention.

In FIG. 1, the transmission includes a main shaft 23 which is drivingly coupled to the vehicle engine. Shaft 23 has external splines 44 which engage with splines 43 of clutch collar 42 such that it rotates with shaft 23 as well as being able to move axially relative shaft 23. A stop 46 is provided about the periphery of splines 46 to prevent clutch collar 42 from moving towards the viewer's right beyond a predetermined location.

A coiled spring 47 is provided with a recess of clutch collar 42 such that it urges it axially toward the viewer's right.

Clutch collar 42 is provided with external teeth 48 that are operative to engage internal teeth 50 of drive gear 70 and causes gear 71 to rotate in unison with shaft 23 when clutch collar is moved towards the viewer's right in response to movement of a shift fork (not shown).

Gear 71 has external teeth 72 that meshingly engage with external teeth 83 of driven gear 85 which is splined to counter-shaft 82 by splines 84 and causes shaft 82 to rotate in an opposite direction to shaft 23 when gear 71 is rotating.

It is desirable that gears 71 and 85 mesh smoothly with each other particularly under conditions of high load and/or when gear 71 is rotating at high speed relative gear 85.

In order to insure that such is the case, a blocker ring 81 is included intermediate clutch collar 81 and gear 71. Blocker ring 81 is splined to teeth 48 of clutch collar 42 and is able to move axially relative thereto. Movement of blocker ring 81 axially towards the viewer's left is prevented by stop ring 60 in gear 71 as shown in FIG. 1. The right end of blocker ring 81 is supported in part by resilient ring 54.

Blocker ring 81 has a conical annular surface 56 about its outer periphery that is operative to register with an internal annular conical surface on gear 71, as blocker ring 81 moves towards the viewer's right. It is preferably upon surface 56 that friction material 90 is provided that is operative to enhance frictional engagement between blocker ring 81 and surface 57 of gear 71 such that blocker ring 81 is operative to frictionally engage gear 71 and ring teeth 50 into synchronous rotation with teeth 48 of clutch collar 42 before they engage as described in greater detail in U.S. Pat. No. 3,983,979 previously described.

Because of high temperatures and exposure of transmission fluids, a friction material comprising a composite of ceramic fiber and flurocarbon polymer is particularly well suited as friction material 90 on blocking ring 81.

However, as previously described, it has been discovered that performance of the composite is even further enhanced by means of controllably increasing the crystallinity of the flurocarbon polymer in spite of the known loss of resiliency and percent recovery after compression that such increase may cause.

Friction material 90 is preferably in the form of a strip that is bonded to surface 56 by a suitable adhesive well known to those skilled in the art of bonding flurocarbon polymers to metal substrates. The adhesive may be of an epoxy type and surface 56 may be etched by a suitable etching material prior to bonding frictional material thereto as is well known to those skilled in the art.

Friction material 90 is a composite of from about 25% to about 75% and more preferably from about 40% to about 60% by weight flurocarbon polymer to the total weight of the composite of which the balance comprises ceramic fibers such as silicon nitride or silicon carbide or alumina-silicate fibers or mixtures thereof dispersed substantially uniformly therein.

Friction material 90 may include other additives compatible with both the flurocarbon polymer and ceramic fibers provided the flurocarbon polymer content remains within the ranges described and that such to not inhibit a controlled increase in crystallinity arising from controlling cooling rate from sintering or annealing temperature ranges as hereinafter described.

Preferably, the flurocarbon polymer is polytetrafluoroethylene (PTFE) polymer due to its superior high temperature and chemical resistance.

Whereas, a strip or sheet of ceramic fiber and FEP or PFA polymer composites may be made by heating such polymer to their respective melt points and thence pressing them into a mold the ceramic fibers or by mixing the ceramic fibers uniformly into their respective melts and then molding the respective sheets or strip or by molding the sheet and then cutting the strip from the sheet, PTFE teflon is more difficult to process and generally is required to be melt fused into the ceramic fiber or by pressing the FEP and ceramic fibers against each other with great force such as described in U.S. Pat. No. 4,593,802 previously described. The thickness of the strip for use on blocker 81 is preferably about 0.04 inch to about 0.06 inch.

It has been discovered that the performance of friction material 90 is greatly improved when the composite ceramic fiber—PTFE is cooled at a rate of less than about 20° C. per minute and more preferably at a rate of less than about 5° C. per minute and even more preferably at a rate of less than about 2° C. per minute after the material has been sintered at a temperature within a prescribed sintering temperature range for a predetermined period of time or after having been annealed at a temperature within a predetermined annealing temperature range for a predetermined period of time.

For PTFE polymer the sintering temperature range is preferably from about 340° C. to about 445° C. and the annealing temperature range is preferably from about 300° C. to about 325° C. with the time period for sintering being from about ½ hour to about 3 hours and that for annealing being from about 5 hours to about 20 hours.

Such sintering or annealing followed by cooling at a rate of less than about 5° C. per minute can be done prior to bonding the composite to a vehicular component such as blocking ring 81 or afterwards where such can be handled readily and the heat will not damage the component. Situations may exist, for example which friction material 90 has been sintered and water or air quenched prior to bonding to the component and thence annealed after bonding to the component followed by cooling at a rate of less than about 5° C. per minute.

By way of example, a composite of about 60% by weight PTFE and about 40% by weight ceramic fiber of about 0.05 inch thick exhibited a relative crystallinity of about 0.108 when measured by a differential scanning calorimeter (DSC) when air or water quenched after sintering versus a relative crystallinity of about 0.332 when cooled at a rate of less than about 5° C. per minute which represents over a 300% increase in relative crystallinity.

By way of further example, composites of about 60% by weight PTFE and ceramic fiber about 2.05 millimeters thick and having respective relative crystallinity values of 0.142 and 0.161 as measured by DSC where compared in a vibratory damping test using Dupont Dynamic analysis (DMA) test equipment. The results of the DMA test showed that the friction material having the 0.161 relative crystallinity, which is about 13.4% grater than the 0.142 friction material, exhibited a glass transition point at about 155.75° C. versus one at about 149.80° C. for the 0.142 material as well as about a 5% increase in elastic modulus as might be expected but also exhibited about a 10% decrease in ability to dampen the vibrations which is indicative of loss of resilience as previously described.

When tested under actual operating conditions on a twin shaft transmission which involved repeated engagements and disengagements between blocker ring 90 and the driven gear 85 previously described, the friction material having the 0.107 relative crystallinity lasted over one million cycles whereas that having the 0.096 relative crystallinity lasted only about 300,000 cycles.

Thus, it is clear that, although taught away from by the art, controlling cooling rate at less than 20° C. per minute and more preferably less than about 5° C. per minute from sintering or annealing temperatures for a composite of ceramic fiber and flurocarbon polymer can be of great advantage in providing improved frictional engagement characteristics for vehicular components such as twin shaft transmission blocker rings as well as any other vehicle part having a component that in one way or another case utilizes the improved frictional material described herein.

What is claimed is:

1. A component for a vehicle part, said component having an improved friction material disposed thereupon operative to enhance frictional engagement therewith, said friction material comprising a composite of from about 25% to about 75% by weight of a flurocarbon polymer and from about 75% to about 25% by weight ceramic fibers dispersed substantially uniformly therein, and said improvement characterized by said material having improved frictional engagement characteristics imparted thereto by reason of said polymer having controlled increased crystallinity arising from said material having been cooled at a rate of less than about 20° C. per minute after having been sintered at a temperature within a predetermined sintering temperature range for said polymer for a predetermined period of time.

2. A component for a vehicle part, said component having an improved friction material disposed thereupon operative to enhance frictional engagement therewith, said friction material comprising a composite of from about 25% to about 75% by weight of a flurocarbon polymer and from about 75% to about 25% by weight ceramic fibers dispersed substantially uniformly therein, and said improvement characterized by said material having improved frictional engagement characteristics imparted thereto by reason of said polymer having controlled increased crystallinity arising from said material having been heated at a temperature within a predetermined annealing temperature range for said polymer for a predetermined period of time and thence having been cooled at a rate of less than about 20° C. per minute.

3. The component of claim 1 or 2 wherein said flurocarbon polymer comprises from about 40% to about 60% by weight of said material.

4. The component of claim 1 or 2 wherein said flurocarbon polymer is selected from the group consisting of polytetrafluoroethylene polymer, fluorinated ethylene-propylene copolymer, and perfluoroalkoxy copolymer.

5. The component of claim 1 wherein the flurocarbon polymer is polytetrafluoroethylene polymer and the sintering temperature range is from about 340° C. to about 440° C. and the time period is from about ½ hour to about 3 hours.

6. The component of claim 2 wherein the flurocarbon polymer is polytetrafluoroethylene polymer and the annealing temperature range is from about 300° C. to about 325° C. and the time period is at least about 5 hours.

7. The component of claim 1 or 2 wherein the cooling rate is less than about 5° C. per minute.

8. The component of claim 1 or 2 wherein the vehicle part is a twin shaft transmission and the component is a blocker ring.

* * * * *